United States Patent
Burns

(10) Patent No.: US 10,947,953 B2
(45) Date of Patent: Mar. 16, 2021

(54) SECONDARY ELECTRIC POWER SYSTEM AND METHOD

(71) Applicant: Hydrospark, Inc., Abingdon, MD (US)

(72) Inventor: Chris Burns, Abington, MD (US)

(*) Notice: Subject to any disclaimer, the term of this patent is extended or adjusted under 35 U.S.C. 154(b) by 0 days.

(21) Appl. No.: 16/545,214

(22) Filed: Aug. 20, 2019

(65) Prior Publication Data

US 2020/0056579 A1 Feb. 20, 2020

Related U.S. Application Data

(60) Provisional application No. 62/719,950, filed on Aug. 20, 2018.

(51) Int. Cl.
*F03B 17/06* (2006.01)
*H02J 3/32* (2006.01)

(52) U.S. Cl.
CPC .............. *F03B 17/061* (2013.01); *H02J 3/32* (2013.01)

(58) Field of Classification Search
CPC .................................. F03B 17/061; H02J 3/32
USPC .......... 290/42–44, 52, 54, 50; 416/85; 475/5
See application file for complete search history.

(56) References Cited

U.S. PATENT DOCUMENTS

| | | | | |
|---|---|---|---|---|
| 1,368,454 A | * | 2/1921 | Rebman | F03B 17/063 416/85 |
| 2,081,510 A | * | 5/1937 | Smart | F16K 31/36 137/624.14 |
| 3,695,367 A | * | 10/1972 | Catterfeld | B23B 45/04 173/221 |
| 3,746,875 A | * | 7/1973 | Donatelli | F03B 13/145 290/42 |
| 4,034,231 A | * | 7/1977 | Conn | E02B 9/08 290/53 |
| 4,109,160 A | * | 8/1978 | Goto | F03B 13/06 290/52 |
| 4,241,283 A | * | 12/1980 | Storer, Sr. | E02B 9/04 290/43 |
| 4,408,127 A | * | 10/1983 | Santos, Sr. | F03B 17/005 290/43 |
| 4,511,808 A | * | 4/1985 | Jost | F03B 13/06 290/54 |
| 4,850,190 A | * | 7/1989 | Pitts | F03B 13/10 60/398 |
| 4,868,408 A | * | 9/1989 | Hesh | F03B 3/04 290/52 |
| 5,007,241 A | * | 4/1991 | Saitou | F03B 17/00 415/62 |

(Continued)

*Primary Examiner* — Pedro J Cuevas
(74) *Attorney, Agent, or Firm* — Duane Morris LLP

(57) ABSTRACT

A secondary electric power system and method of operation are disclosed. The system contains a grid having an array of turbines by which pressurized fluid is used to generate electricity to power a residential, commercial, agricultural or industrial structure. The secondary system may be a backup power source to the structure when a primary source is temporarily unavailable or may be a primary source in some circumstances. The method pumps fluid from a first pressure to a second pressure and exposes the fluid to a grid of turbine driven generators, the pressure is reduced across the grid to a third pressure that is less than the second. Additionally embodiments of the system are integrated into and incorporate components of other building utilities, e.g. water, sewer and fire control.

1 Claim, 15 Drawing Sheets

(56) References Cited

U.S. PATENT DOCUMENTS

| | | | | |
|---|---|---|---|---|
| 5,040,945 | A * | 8/1991 | Levesque | F01D 11/02 290/52 |
| 5,083,039 | A * | 1/1992 | Richardson | H02J 3/38 290/44 |
| 5,225,712 | A * | 7/1993 | Erdman | F03D 7/042 290/44 |
| 5,281,856 | A * | 1/1994 | Kenderi | F03B 17/061 290/43 |
| 5,420,463 | A * | 5/1995 | Agostino | F03B 17/005 290/53 |
| 5,440,176 | A * | 8/1995 | Haining | F03B 13/10 290/54 |
| 6,396,162 | B1 * | 5/2002 | Carrillo | F03B 13/08 290/43 |
| 6,479,907 | B1 * | 11/2002 | Eriksson | F03D 9/25 290/44 |
| 6,856,036 | B2 * | 2/2005 | Belinsky | F03B 17/063 290/42 |
| 6,930,407 | B2 * | 8/2005 | Panholzer | F03B 13/105 290/53 |
| 6,954,006 | B2 * | 10/2005 | Williams, Jr. | F03B 17/062 290/43 |
| 6,955,049 | B2 * | 10/2005 | Krouse | F03B 13/10 60/641.7 |
| 6,982,498 | B2 * | 1/2006 | Tharp | F03B 17/06 290/43 |
| 6,995,479 | B2 * | 2/2006 | Tharp | F03B 17/06 290/43 |
| 6,998,730 | B2 * | 2/2006 | Tharp | F03B 17/06 290/52 |
| 7,005,758 | B2 * | 2/2006 | Yumita | F03B 13/00 290/43 |
| 7,042,114 | B2 * | 5/2006 | Tharp | F03B 17/06 290/54 |
| 7,084,521 | B1 * | 8/2006 | Martin | F03B 13/086 290/50 |
| 7,262,517 | B1 * | 8/2007 | Srybnik | E02B 9/04 290/43 |
| 7,293,960 | B2 * | 11/2007 | Yamamoto | F03D 13/40 416/85 |
| 7,319,278 | B2 * | 1/2008 | Gehring | F03B 13/1885 290/42 |
| 7,339,284 | B2 * | 3/2008 | Manchester | F03B 13/264 290/42 |
| 7,357,599 | B2 * | 4/2008 | Cripps | E03F 3/00 290/1 R |
| 7,388,302 | B1 * | 6/2008 | Srybnik | E02B 9/04 290/43 |
| 7,417,334 | B2 * | 8/2008 | Uchiyama | H02K 7/14 290/55 |
| 7,452,160 | B2 * | 11/2008 | Cripps | E03F 3/00 290/1 R |
| 7,466,035 | B1 * | 12/2008 | Srybnik | F03B 17/063 290/43 |
| 7,478,974 | B1 * | 1/2009 | Kelly | E02B 9/02 405/75 |
| 7,554,215 | B1 * | 6/2009 | Caragine | F03B 17/00 290/42 |
| 7,564,144 | B1 * | 7/2009 | Srybnik | F03D 9/007 290/54 |
| 7,595,565 | B2 * | 9/2009 | Chen | F03D 1/00 290/55 |
| 7,605,490 | B2 * | 10/2009 | Srybnik | F03B 1/02 290/52 |
| 7,619,320 | B2 * | 11/2009 | Omer | F03B 7/003 290/45 |
| 7,632,040 | B2 * | 12/2009 | Cripps | E02B 9/00 290/1 R |
| 7,768,146 | B2 * | 8/2010 | Balzano | F03B 13/00 290/54 |
| 7,802,942 | B2 * | 9/2010 | Cripps | F03B 15/04 405/75 |
| 7,812,472 | B2 * | 10/2010 | Allaei | B82Y 15/00 290/44 |
| 7,939,970 | B1 * | 5/2011 | Walling | H02J 3/381 307/84 |
| 7,944,069 | B2 * | 5/2011 | Uchiyama | F03D 9/11 290/44 |
| 7,946,789 | B2 * | 5/2011 | Cripps | E02B 9/00 405/75 |
| 7,948,106 | B2 * | 5/2011 | Sugano | F03B 17/061 290/54 |
| 8,002,499 | B2 * | 8/2011 | Cripps | E02B 9/04 405/75 |
| 8,016,548 | B2 * | 9/2011 | Ziegenfuss | F03B 13/10 415/118 |
| 8,072,089 | B2 * | 12/2011 | Krouse | F03B 13/08 290/54 |
| 8,147,167 | B2 * | 4/2012 | Cripps | E02B 9/00 405/75 |
| 8,147,168 | B2 * | 4/2012 | Cripps | E03F 3/02 405/75 |
| 8,193,656 | B2 * | 6/2012 | Che | F03D 13/20 290/54 |
| 8,358,022 | B2 * | 1/2013 | Wilks | F03B 17/005 290/43 |
| 8,376,656 | B2 * | 2/2013 | Cripps | E03F 7/00 405/75 |
| 8,550,746 | B2 * | 10/2013 | Cripps | E03F 3/02 405/75 |
| 8,558,402 | B2 * | 10/2013 | Krouse | F03B 13/08 290/52 |
| 8,585,320 | B2 * | 11/2013 | Cripps | F03B 7/00 405/75 |
| 8,794,873 | B2 * | 8/2014 | Cripps | E03F 3/00 405/75 |
| 8,841,796 | B2 * | 9/2014 | Rosenvard | F03D 7/048 307/40 |
| 8,866,334 | B2 * | 10/2014 | Donnelly | H02J 3/383 307/21 |
| 8,872,379 | B2 * | 10/2014 | Ruiz | H02J 13/00002 307/66 |
| 8,901,767 | B2 * | 12/2014 | Krouse | F03B 13/08 290/54 |
| 9,057,354 | B1 * | 6/2015 | Walsh | F03B 13/00 |
| 9,151,269 | B2 * | 10/2015 | Han | F03B 13/264 |
| 9,157,411 | B2 * | 10/2015 | Cripps | E02B 9/02 |
| 9,206,573 | B2 * | 12/2015 | Lin | F03B 13/264 |
| 9,561,860 | B2 * | 2/2017 | Knapp | G08G 5/0052 |
| 9,587,619 | B2 * | 3/2017 | Sepp | F03B 13/10 |
| 9,593,664 | B2 * | 3/2017 | Cripps | E02B 9/04 |
| 9,593,665 | B2 * | 3/2017 | Santana | F03B 17/063 |
| 9,803,614 | B2 * | 10/2017 | Williams | F03B 13/08 |
| 9,837,824 | B2 * | 12/2017 | Kjær | H02J 5/00 |
| 9,869,292 | B2 * | 1/2018 | Kang | F03B 15/16 |
| 10,029,631 | B2 * | 7/2018 | Iwashima | B60L 53/56 |
| 10,211,636 | B2 * | 2/2019 | Gudgel | H02J 3/386 |
| 10,233,895 | B2 * | 3/2019 | Yeo | H02P 9/107 |
| 10,270,252 | B2 * | 4/2019 | Gudgel | H02J 1/001 |
| 10,277,035 | B2 * | 4/2019 | Gudgel | H02J 3/387 |
| 10,279,759 | B2 * | 5/2019 | Iwashima | G05B 13/02 |
| 10,501,194 | B2 * | 12/2019 | Knapp | B64C 11/44 |
| 10,615,605 | B2 * | 4/2020 | Gudgel | H02J 3/387 |
| 10,790,671 | B2 * | 9/2020 | Gudgel | H02J 7/04 |
| 2004/0189010 | A1 * | 9/2004 | Tharp | F03B 17/06 290/54 |
| 2005/0001432 | A1 * | 1/2005 | Drentham Susman | F03B 17/061 290/43 |
| 2005/0017513 | A1 * | 1/2005 | Sipp | F03B 17/063 290/54 |
| 2007/0040385 | A1 * | 2/2007 | Uchiyama | F03D 9/11 290/44 |
| 2008/0265583 | A1 * | 10/2008 | Thompson | F03B 13/264 290/54 |
| 2008/0315709 | A1 * | 12/2008 | Uchiyama | H02K 7/183 310/209 |
| 2009/0134623 | A1 * | 5/2009 | Krouse | F03B 13/264 290/43 |

(56) References Cited

U.S. PATENT DOCUMENTS

| | | | | |
|---|---|---|---|---|
| 2009/0179427 A1* | 7/2009 | Cripps | F03B 13/10 | 290/54 |
| 2010/0066092 A1* | 3/2010 | Wilks | F03B 17/005 | 290/54 |
| 2011/0018353 A1* | 1/2011 | Yu | H02J 5/00 | 307/82 |
| 2011/0175355 A1* | 7/2011 | Rosenvard | F03D 7/048 | 290/44 |
| 2011/0204720 A1* | 8/2011 | Ruiz | B60L 1/003 | 307/66 |
| 2011/0281679 A1* | 11/2011 | Larrabee | B64C 39/024 | 475/5 |
| 2012/0149516 A1* | 6/2012 | Larrabee | B63H 23/18 | 475/5 |
| 2012/0292907 A1* | 11/2012 | Krouse | F03B 13/264 | 290/52 |
| 2012/0329593 A1* | 12/2012 | Larrabee | B64D 27/04 | 475/5 |
| 2013/0328315 A1* | 12/2013 | Portolan | H02K 7/083 | 290/54 |
| 2014/0032002 A1* | 1/2014 | Iwashima | B64D 41/007 | 700/295 |
| 2014/0197681 A1* | 7/2014 | Iwashima | H02J 3/32 | 307/9.1 |
| 2014/0241855 A1* | 8/2014 | Han | F03B 17/06 | 415/60 |
| 2015/0021999 A1* | 1/2015 | Rodriguez | H02J 3/008 | 307/52 |
| 2015/0165990 A1* | 6/2015 | Iwashima | B60R 16/03 | 307/9.1 |
| 2015/0183385 A1* | 7/2015 | Iwashima | B64D 41/007 | 307/9.1 |
| 2015/0260151 A1* | 9/2015 | Kang | F03B 15/16 | 700/282 |
| 2015/0263526 A1* | 9/2015 | Kjær | H02J 5/00 | 290/44 |
| 2016/0236790 A1* | 8/2016 | Knapp | G08G 5/0021 | |
| 2018/0023538 A1* | 1/2018 | Prill | F03B 17/061 | 416/117 |
| 2018/0076624 A1* | 3/2018 | Gudgel | H02M 7/44 | |
| 2018/0076625 A1* | 3/2018 | Gudgel | H02J 3/381 | |
| 2018/0076626 A1* | 3/2018 | Gudgel | H02J 7/0068 | |
| 2018/0076663 A1* | 3/2018 | Gudgel | H02J 3/38 | |
| 2018/0134400 A1* | 5/2018 | Knapp | B64D 27/24 | |
| 2018/0313324 A1* | 11/2018 | Yeo | F03B 3/183 | |
| 2019/0260206 A1* | 8/2019 | Gudgel | H02J 7/00 | |

* cited by examiner

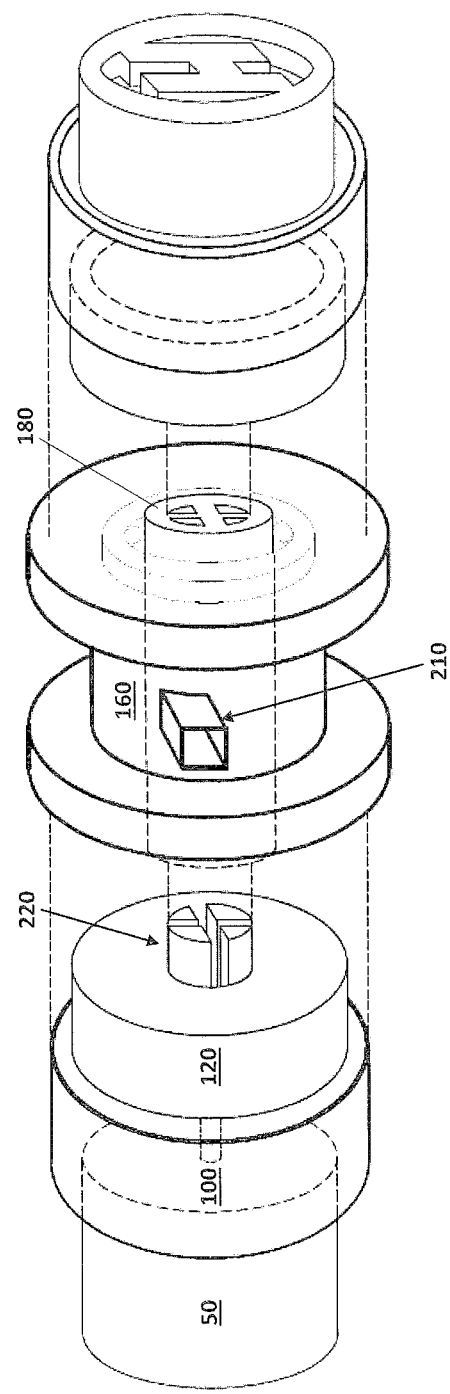

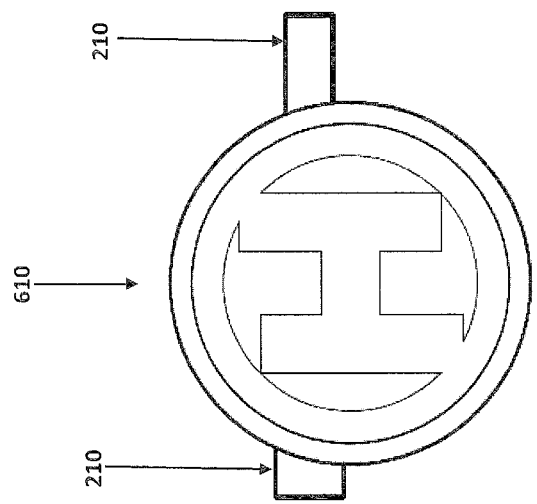
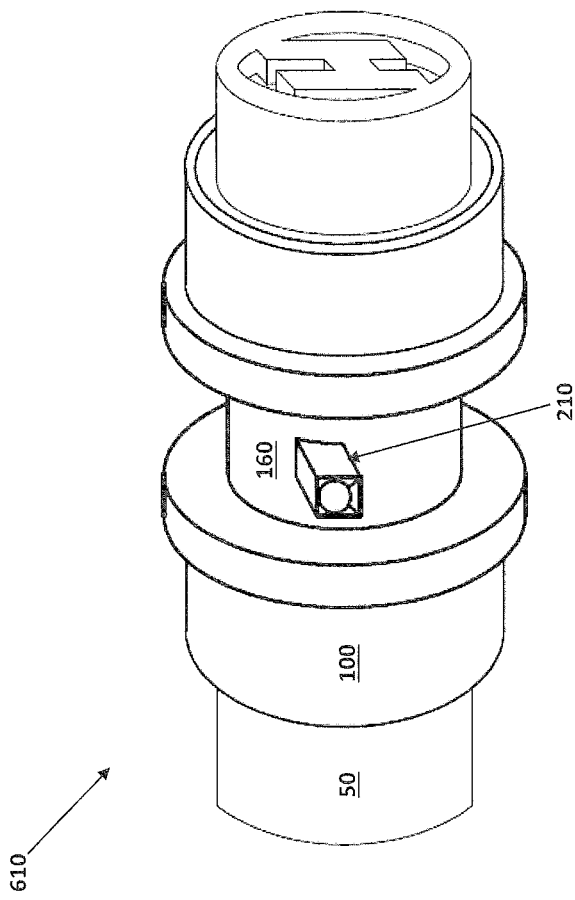
FIG. 6D
FIG. 6C

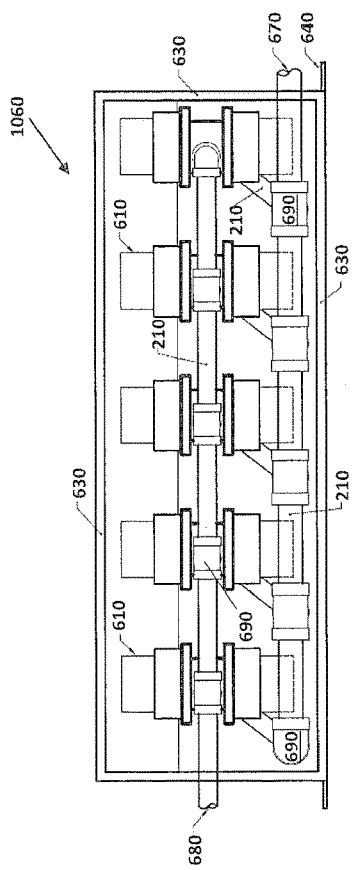
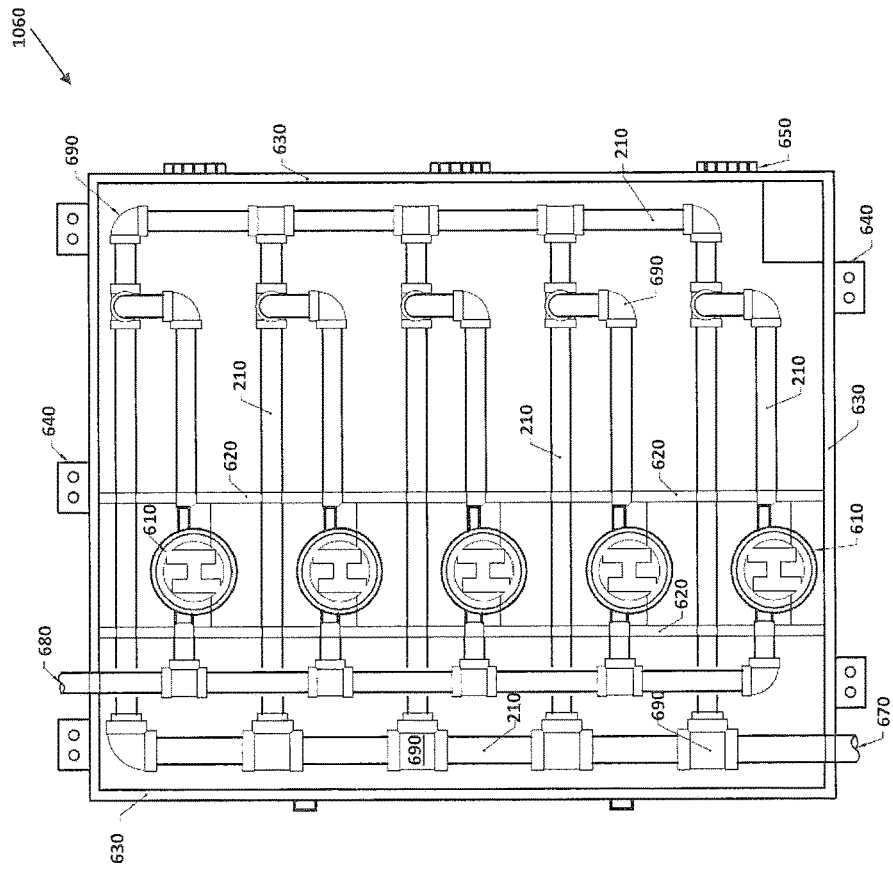

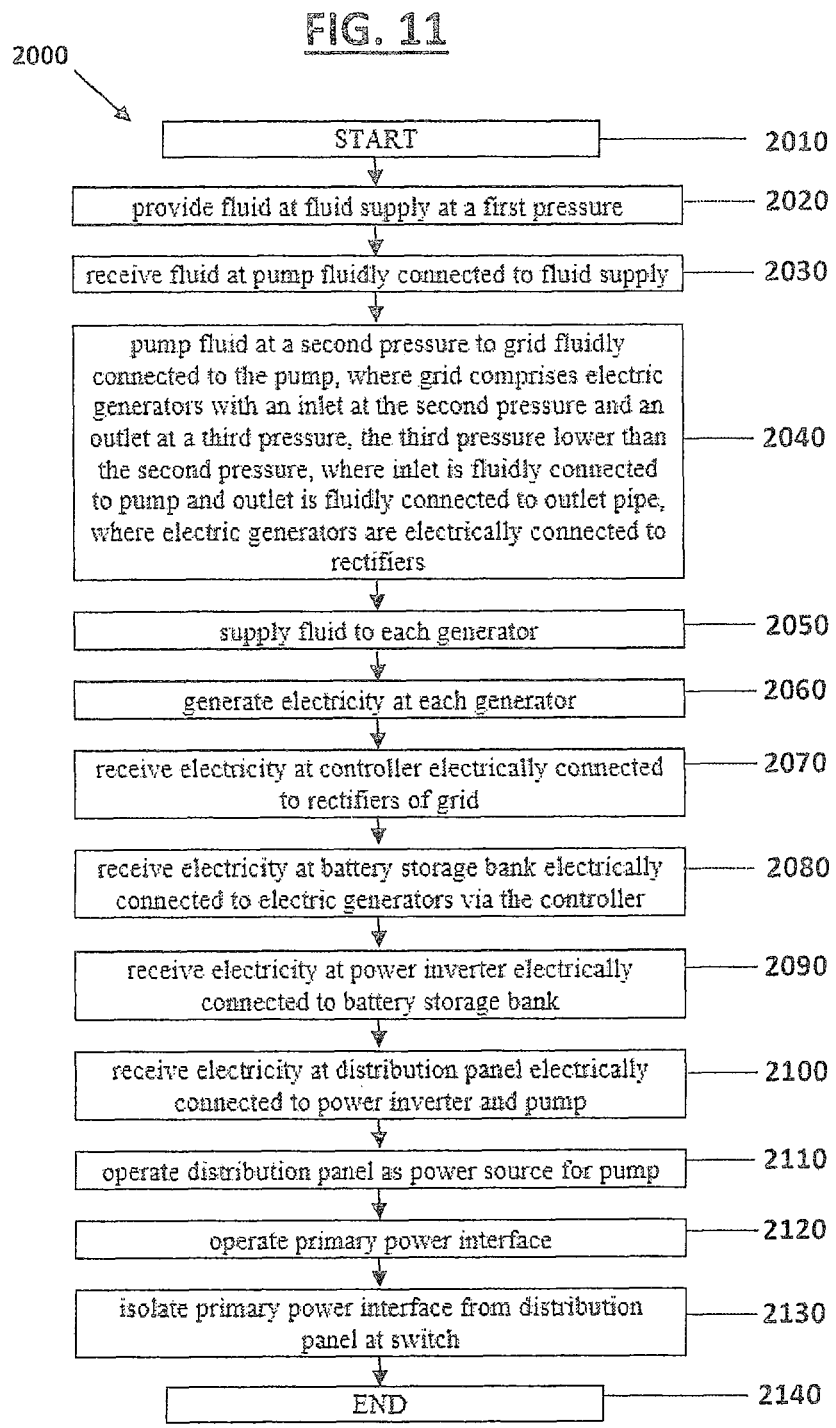

SECONDARY ELECTRIC POWER SYSTEM AND METHOD

CROSS-REFERENCE TO RELATED APPLICATIONS

The present application is a utility of and claims priority benefit of provisional application No. 62/719,950 filed on Aug. 20, 2018, entitled "Secondary Electric Power System and Method." The entirety of this application is herein incorporated by reference.

FIELD OF THE DISCLOSURE

The present inventions relate generally to a secondary electric power system and method of operation.

BACKGROUND

Electric generators are extremely useful in homes and businesses when a primary power interface fails or is switched off. Current generators may use solar energy or natural gas to power electronic devices when there is a power outage. The photovoltaic cells in solar panels use photons released from the sun to generate electricity, and natural gas generators use an internal combustion engine to burn gas and generate electricity. However, purchasing and installing conventional generators can be very expensive. Improvements to generator technology and secondary power systems are desirable to provide alternate solutions when a primary power interface fails and to improve energy efficiency and environmental impact and decrease the cost of alternate power systems.

SUMMARY

According to some aspects of the present disclosure, a secondary electric power system comprises a fluid supply, a pump, a grid, a controller, a battery storage bank, a power inverter, a distribution panel, a primary power interface, and a manual or automatic transfer switch. The fluid supply contains a fluid at a static head, and the pump is fluidly connected to the fluid supply. The fluid supply may be a tank or reservoir. The static head may also be referred to as a first pressure. The grid is fluidly connected to and receives fluid from the pump at a second pressure, and the second pressure is higher than the first. The grid comprises a plurality of electric generators, which have an inlet and outlet. The inlet is in fluid communication with the pump and the outlet is in fluid communication with an outlet pipe. The inlet is at the second pressure, and the outlet is at a third pressure, where the third pressure is lower than the second. The third pressure may be lower than the first pressure. Each of the electric generators is electrically connected to a rectifier. The controller is electrically connected to and receives electricity from the rectifiers of the grid. The battery storage bank is electrically connected via the controller to the plurality of generators. The power inverter is electrically connected to and receives electricity from the battery storage bank. The distribution panel is electrically connected to and receives electricity from the power inverter. The distribution panel is electrically connected to the pump and functions as a power source for the pump. The manual or automatic transfer switch isolates the primary power interface from the distribution panel.

According to some aspects of the present disclosure, a method of operating a secondary electric power system comprises providing a fluid at a fluid supply at a first pressure. The method further comprises receiving the fluid at a pump fluidly connected to the fluid supply and pumping the fluid at a second pressure to a grid fluidly connected to the pump. The grid comprises a plurality of electric generators, which have an inlet and outlet. The inlet is in fluid communication with the pump, and the outlet is in fluid communication with an outlet pipe. The inlet is at the second pressure and the outlet is at a third pressure, where the third pressure is lower than the second pressure. The third pressure may be lower than the first pressure. Each one of the electric generators is electrically connected to a rectifier. The method further comprises supplying the fluid to each of the plurality of electric generators and generating electricity at each one of the electric generators. The method further comprises receiving electricity at a controller, battery storage bank, power inverter, and distribution panel. The controller is electrically connected to the rectifiers of the grid. The battery storage bank is electrically connected to the plurality of electric generators via the controller. The power inverter is electrically connected to the battery storage bank. The distribution panel is electrically connected to the power inverter and the pump. The method further comprises operating the distribution panel as a power source for the pump. The method further comprises operating a primary power interface and isolating the primary power interface from the distribution panel at a manual or automatic transfer switch.

According to some aspects of the present disclosure, a grid comprises a supply pipe, a plurality of branch pipes, a plurality of electric generators, and an outlet pipe. The supply pipe receives a fluid from a fluid supply at a first pressure. The plurality of branch pipes are coupled to and receive fluid from the supply pipe. The plurality of electric generators are each coupled to one of the branch pipes. Each generator comprises a fluid wheel, a ring gear housing, a plurality of planet gears, a sun gear, a magnetic rotor, a plurality of stationary stator coils, and a power output. The plurality of planet gears may include star gears. The fluid wheel comprises a plurality of cups coupled to a fluid wheel axle. The cups receive the fluid from one of the branch pipes, which propels the cups and spins the fluid wheel axle. The ring gear housing is coupled to the fluid wheel axle. The plurality of planet gears is propelled by the ring gear housing. The sun gear is propelled by the plurality of planet gears. The magnetic rotor is propelled around the plurality of stationary stator coils by the sun gear. The power output is connected to a bridge rectifier. The bridge rectifier may include a voltage regulator. The plurality of generators may be fluidly connected in parallel, series, or a combination of the two. The outlet pipe receives the fluid from the plurality of generators at a second pressure, where the second pressure is less than the first pressure.

BRIEF DESCRIPTION OF THE DRAWINGS

FIG. 6B is an isometric exploded view of an electric generator, in accordance with some embodiments of the present disclosure.

FIG. 6C is an isometric view of an electric generator, in accordance with some embodiments of the present disclosure.

FIG. 6D is a front view of an electric generator, in accordance with some embodiments of the present disclosure.

FIG. 7A is an front view of a grid, in accordance with some embodiments of the present disclosure.

FIG. 7B is a cross-sectional view of a grid, in accordance with some embodiments of the present disclosure.

FIG. 11 is a flow chart of a method of operating a secondary electric power system, in accordance with some embodiments of the present disclosure.

DETAILED DESCRIPTION

Figure 1:
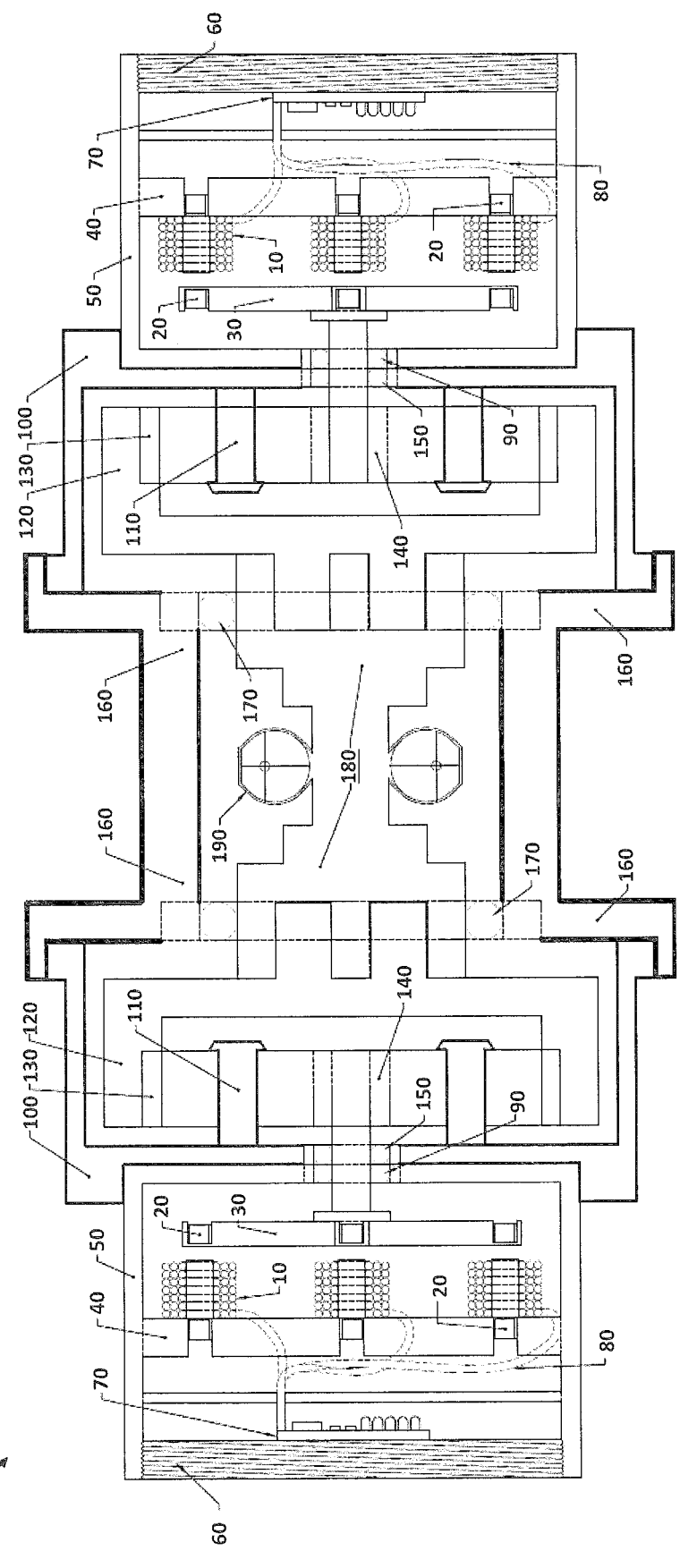
FIG. 1 is a cross-sectional view of an electric generator taken along an axis of rotation of the fluid wheel axle, in accordance with some embodiments of the present disclosure.

For the purposes of promoting an understanding of the principles of the disclosure, reference will now be made to a number of illustrative embodiments in the drawings and specific language will be used to describe the same.

The present disclosure is directed to a secondary electric power system equipped to generate power from a pressurized fluid flowing through a grid of electric generators that use a fluid wheel to generate electricity. In some embodiments, the pressurized fluid flowing through the secondary electric power system may include water, oil, glycerin, or air. In some embodiments the fluid wheel may be a turbine or a water wheel. If the secondary electric power system were installed in a home or business, it could employ the building's water supply as a fluid supply, making the system an improvement over traditional secondary power systems that are expensive or involve extensive installations. The secondary electric power system provides electricity when a primary power fails or is switched off, or otherwise not available.

FIG. 1 shows a cross-sectional view of electric generator 610, which is a device that uses pressurized fluid (which may be a liquid or air) flowing through it to generate electricity. The pressurized fluid enters through the fluid wheel housing 160, striking the cup 190 and spinning the wheel axle 180. The ring gear housing 120 and ring gear 130 spin the planet gears 200 (in this configuration, these gears are also known as star gears) (shown in FIG. 4A) within planetary gear housing 100. The planet gears 200 may include star gears. The planet/star gears 200, in turn, spin the sun gear 140. The sun gear 140 spins the spinning rotor axle 230 (shown in FIG. 3A), which spins magnetic rotor 30 around the stator winding 10 within the stationary stator coil and stationary magnet housing 40. This generates a power output by means of magnetic induction. The power output is wired via magnetic stator wiring 80 into a bridge rectifier. The bridge rectifier may include a voltage regulator in circuit board 70, which controls the voltage output and converts the power output into direct current (DC). The power output is a function of the RPM of the generators 610. The generator 610 terminates on each end in a threaded stator housing cap 60. Alternatively the ring gear 130 may remain stationary and the planet gear carrier may be driven by the axle 180.

While the disclosed subject matter is illustrated with respect to a water wheel, other mechanisms to drive the system are similarly envisioned, such as a fly wheel, chain driven sprocket, belt driven pulley or friction drive.

Figure 2B:
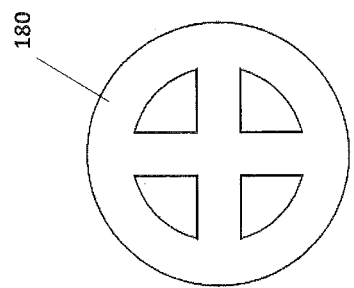
FIG. 2B is an elevation view along A-A of FIG. 2A, in accordance with some embodiments of the present disclosure.
Figure 2A:
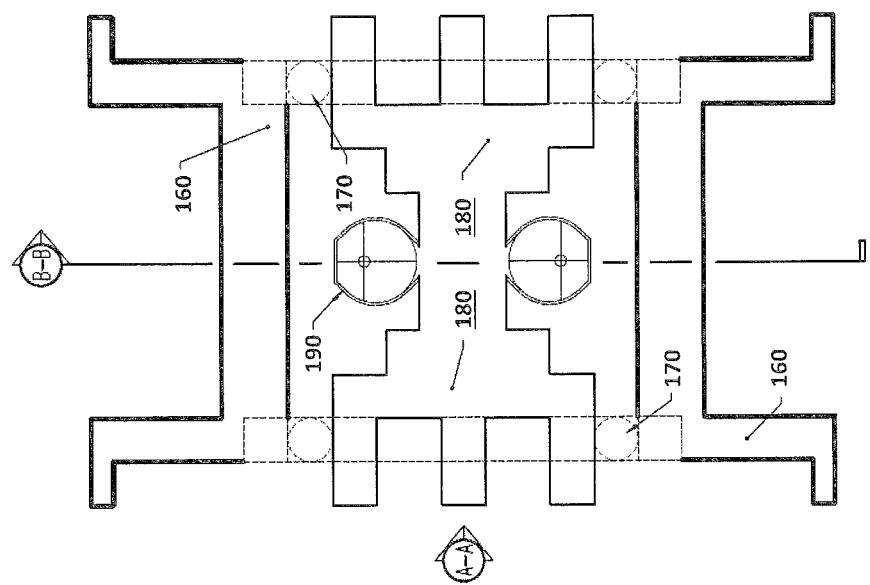
FIG. 2A is a cross-sectional view of a portion of an electric generator taken along an axis of rotation of the fluid wheel axle, in accordance with some embodiments of the present disclosure.

FIG. 2A is a cross-sectional view of a portion of an electric generator 610, showing the fluid wheel axle 180 and housing 160 details. Fluid wheel housing 160 contains cups 190 attached to fluid wheel axle 180. Fluid wheel axle 180 is supported by sealed ball bearings 170, which allow the axle to rotate within the fluid wheel housing 160.

FIG. 2B is an elevation view along A-A of FIG. 2A, showing fluid wheel axle 180.

Figure 2D:
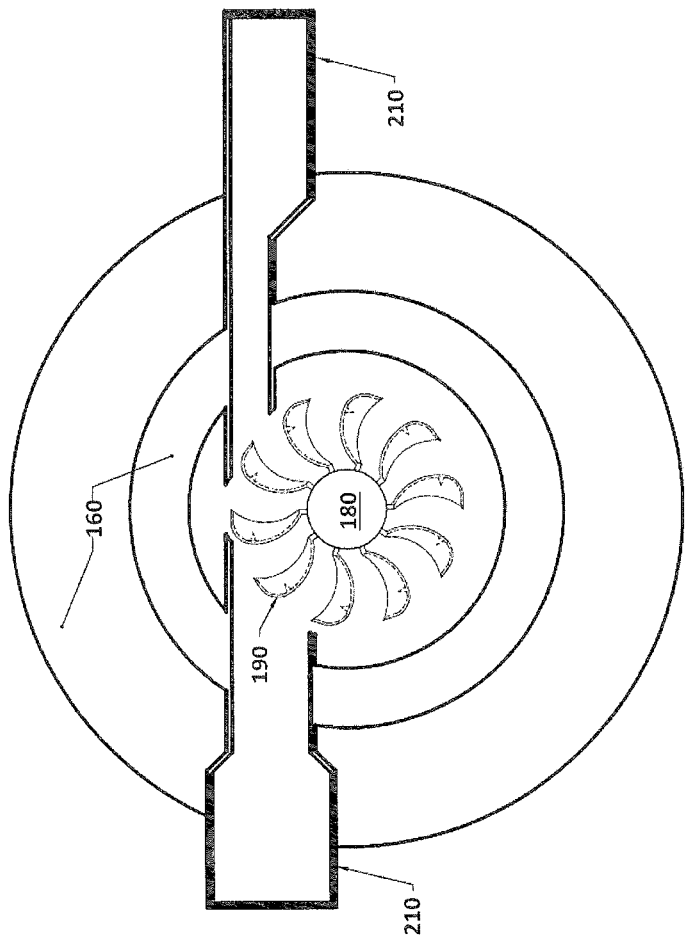
FIG. 2D is a cross-sectional view taken along line B-B of FIG. 2A, in accordance with some embodiments of the present disclosure.
Figure 2C:
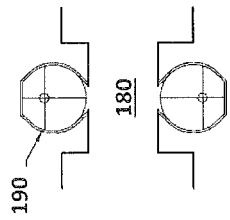
FIG. 2C is a cross-sectional view of a portion of an electric generator taken along an axis of rotation of the fluid wheel axle, in accordance with some embodiments of the present disclosure.

FIG. 2C is a cross-sectional view of a portion of an electric generator 610, showing cups 190 attached to fluid wheel axle 180.

FIG. 2D is a cross-sectional view taken along line B-B of FIG. 2A, showing how grid pipe 210 interfaces with the fluid wheel housing 160. A fluid enters the generator 610 through grid pipe 210, striking cups 190 and spinning the fluid wheel axle 180.

Figure 3B:
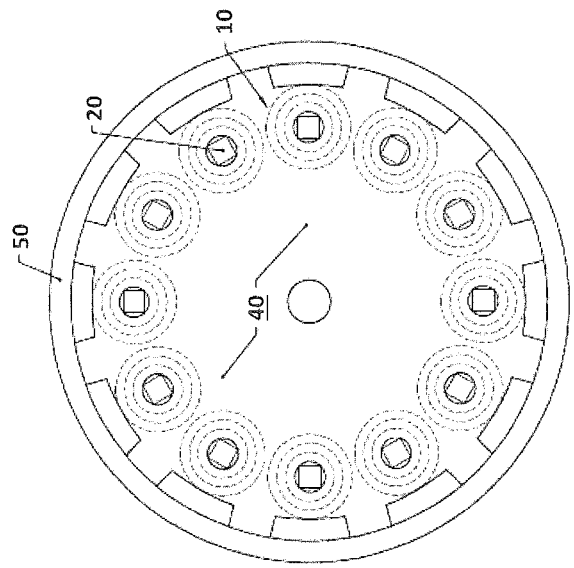
FIG. 3B is a cross-sectional view taken along line C-C of FIG. 3A, in accordance with some embodiments of the present disclosure.
Figure 3A:
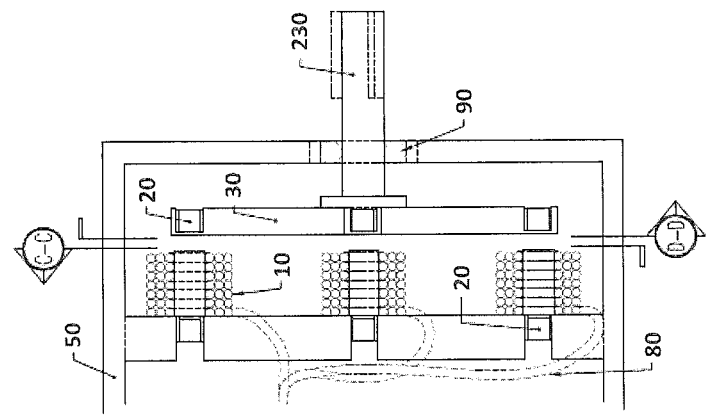
FIG. 3A is a cross-sectional view of a portion of an electric generator taken along an axis of rotation of the fluid wheel axle, in accordance with some embodiments of the present disclosure.

FIG. 3A is a cross-sectional view of a portion of an electric generator 610, showing the stator set housing 50.

Spinning rotor axle 230 is connected to the sun gear 140, which spins axle 230. Spinning rotor axle 230 is supported by sealed ball bearings 90, which allow the axle to rotate. Spinning rotor axle 230 is connected to magnetic rotor 30, which includes neodymium magnetic cubes 20 at each end of the magnetic rotor 30. Stator set housing 50 contains stator winding 10, which is coupled to magnetic stator wiring 80, which carries the power output from the generator 610 into a bridge rectifier. The bridge rectifier may include a voltage regulator in circuit board 70 (shown in FIG. 1).

FIG. 3B is a cross-sectional view taken along line C-C of FIG. 3A, showing that stator set housing 50 contains stationary stator coil and stationary magnet housing 40, which includes multiple neodymium magnetic cubes 20, surrounded by stator winding 10.

Figure 3D:
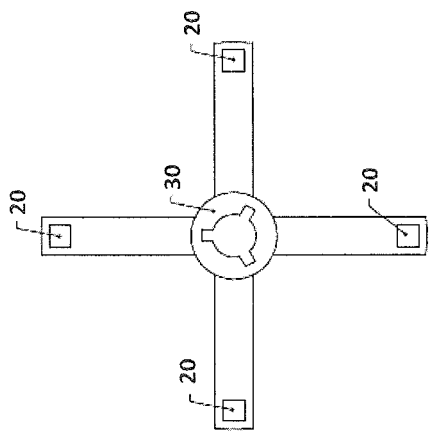
FIG. 3D is a cross-sectional view taken along line D-D of FIG. 3A, in accordance with some embodiments of the present disclosure.
Figure 3C:
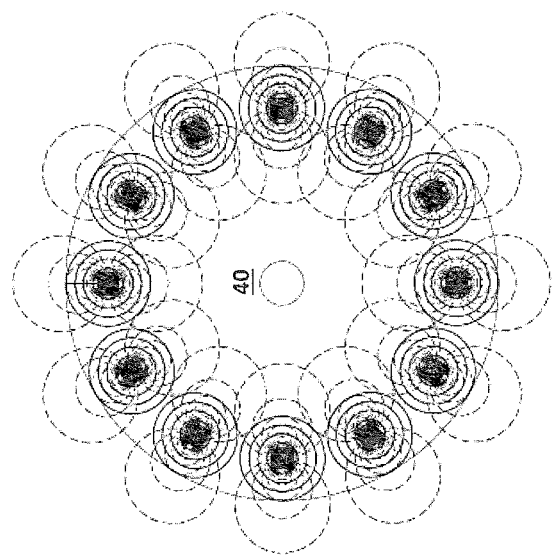
FIG. 3C is a magnetic force diagram showing a cross-section taken along line C-C of FIG. 3A, in accordance with some embodiments of the present disclosure.

FIG. 3C is a magnetic force diagram showing the magnetic forces in stationary stator coil and stationary magnet housing 40.

FIG. 3D is a cross-sectional view taken along line D-D of FIG. 3A, showing that magnetic rotor 30 includes neodymium magnetic cubes 20 proximate each terminal end.

Figure 4B:
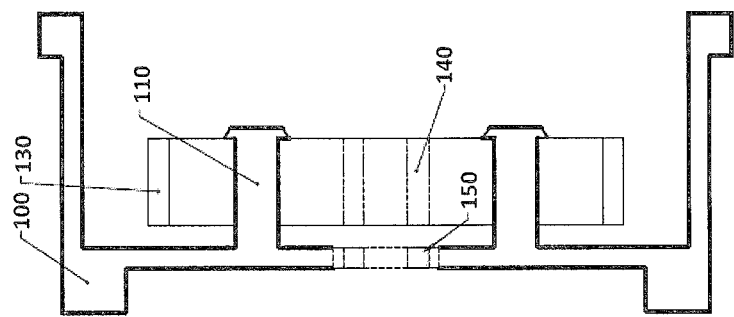
FIG. 4B is a cross-sectional view of a portion of an electric generator taken along an axis of rotation of the fluid wheel axle, in accordance with some embodiments of the present disclosure.
Figure 4A:
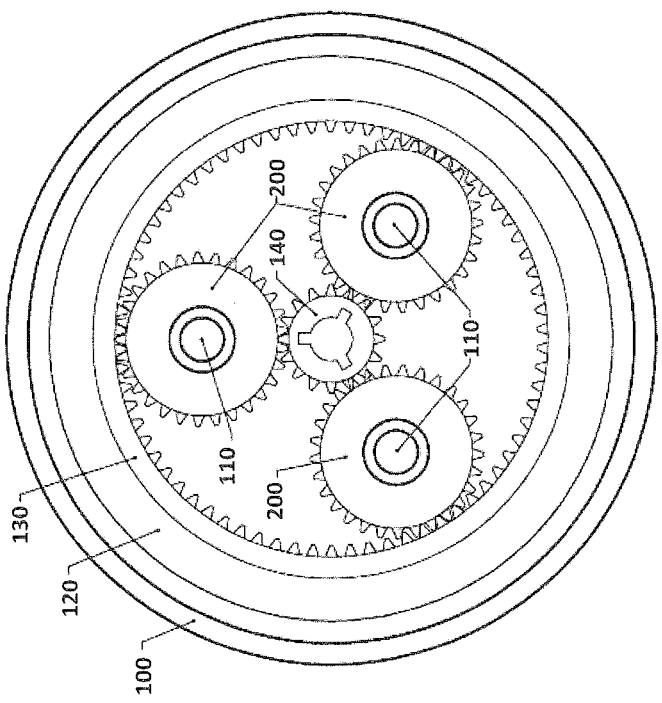
FIG. 4A is a cross-sectional view of a portion of an electric generator taken normal to an axis of rotation of the fluid wheel axle, in accordance with some embodiments of the present disclosure.

FIGS. 4A and 4B show detailed views of the planetary gear housing 100, which includes installation pegs 110 for the planet gears 200. Planetary gear housing 100 contains sealed ball bearings 150, which allow the sun gear 140 to rotate. Ring gear housing 120 contains ring gear 130, which spins the planet gears 200. As the planet gears 200 spin, they in turn spin the sun gear 140, which is connected to spinning rotor axle 230, which spins magnetic rotor 30 (shown in FIG. 1).

Figure 5C:
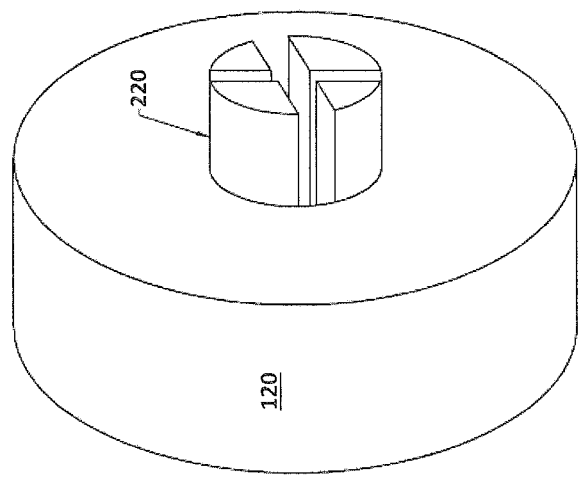
FIG. 5C is an isometric view of a portion of an electric generator, in accordance with some embodiments of the present disclosure.
Figure 5B:
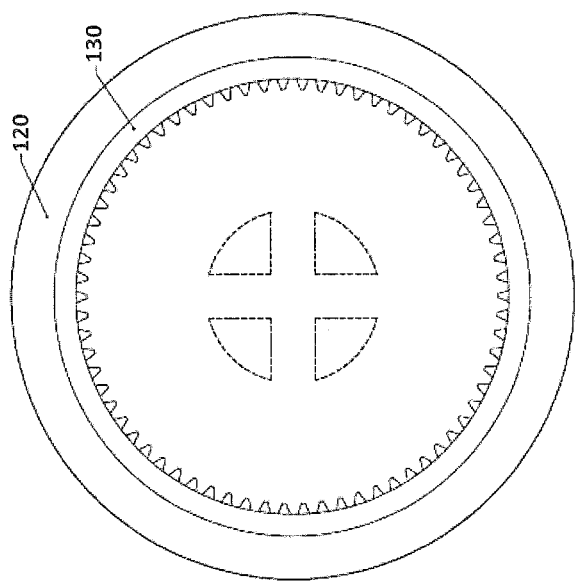
FIG. 5B is a cross-sectional view of a portion of an electric generator taken normal to an axis of rotation of the fluid wheel axle, in accordance with some embodiments of the present disclosure.
Figure 5A:
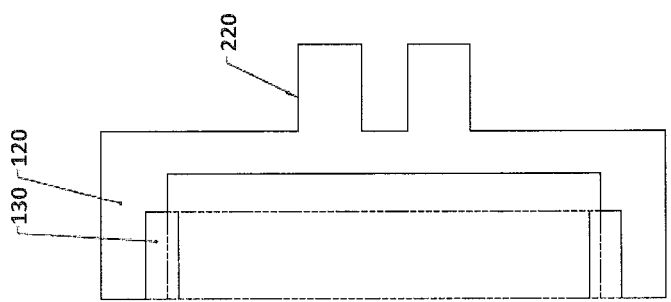
FIG. 5A is a cross-sectional view of a portion of an electric generator taken along an axis of rotation of the fluid wheel axle, in accordance with some embodiments of the present disclosure.

FIGS. 5A, 5B, and 5C show cross-sectional and isometric partial views of electric generator 610, including detailed views of the ring gear 130 and ring gear housing 120. The ring gear housing 120 is connected to the fluid wheel axle 180 (shown in FIG. 1) via legs 220.

Figure 6A:
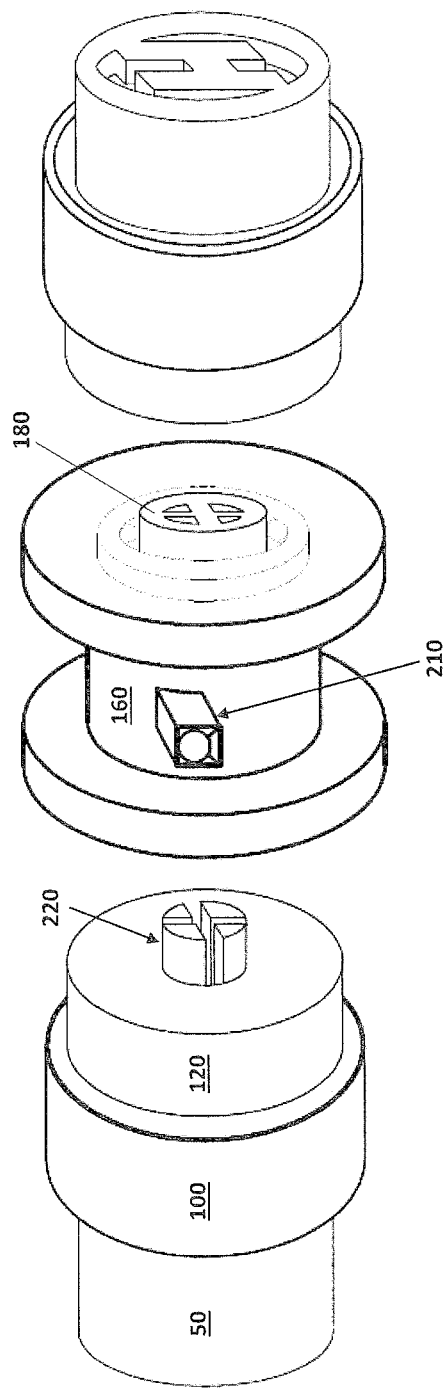
FIG. 6A is an isometric exploded view of an electric generator, in accordance with some embodiments of the present disclosure.

FIG. 6A shows an isometric exploded view of an electric generator 610. This view illustrates various components of generator 610 prior to assembly, including: stator set housing 50, planetary gear housing 100, ring gear housing 120, legs 220 for connection to the fluid wheel axle 180, fluid wheel housing 160, grid pipe 210, and fluid wheel axle 180.

FIG. 6B shows an isometric exploded view of an electric generator 610 similar to FIG. 6A, with the addition of dashed lines that show how the generator components fit together upon assembly.

FIG. 6C shows an isometric view of an assembled electric generator 610.

FIG. 6D shows a front view of the electric generator 610 of FIG. 6C.

FIG. 7A shows a front view of a grid 1060, and FIG. 7B shows a cross-sectional view of grid 1060. A fluid originating in fluid storage tank 1030 enters pump 1040 (shown in FIG. 8) at a first pressure. Pump 1040 (shown in FIG. 8) may be used to increase the pressure of the fluid before it enters the grid 1060. Thus, the fluid is pumped into grid 1060 as incoming fluid 670 at a second pressure. The grid 1060 will be more efficient the higher the head of the incoming fluid 670. The grid 1060 comprises grid pipes 210 including a supply main pipe, through which incoming fluid 670 enters, and a dead main pipe run opposite the supply main with multiple pipes (branch lines) connected from the supply main to the dead main. The dead main pipe may also be referred to as an outlet pipe or discharge pipe 680. Grid pipes 210 are interconnected by grid pipe fittings 690. This structure creates a balanced grid. The branch lines (grid pipes 210 that connect from the supply main to the dead main) contain outlets that supply fluid to spin cups 190 within electric generator 610. In some embodiments cups 190 may be vanes on a turbine if the incoming fluid 670 is air. In some embodiments the cups 190 may be cups on a water wheel if the incoming fluid 670 is water or another liquid. The pressurized fluid is run through fluid wheel housings 160 within electric generators 610 and exits each generator at a lower pressure than the fluid pressure at the generator inlet. The fluid is discharged from the grid through discharge pipe 680. In some embodiments, discharge pipe 680 may lead to a drain or the atmosphere. In some embodiments, discharge pipe 680 may recirculate the fluid back through the system. The grid 1060 includes mounting brackets 620 to support generators 610. The grid housing 630 includes grid mounting brackets 640 on its exterior to enable installation and mounting of the grid 1060. Additionally, the grid housing 630 also includes grid door hinges 650 so a user may include a door to enclose the grid 1060.

Figure 8:
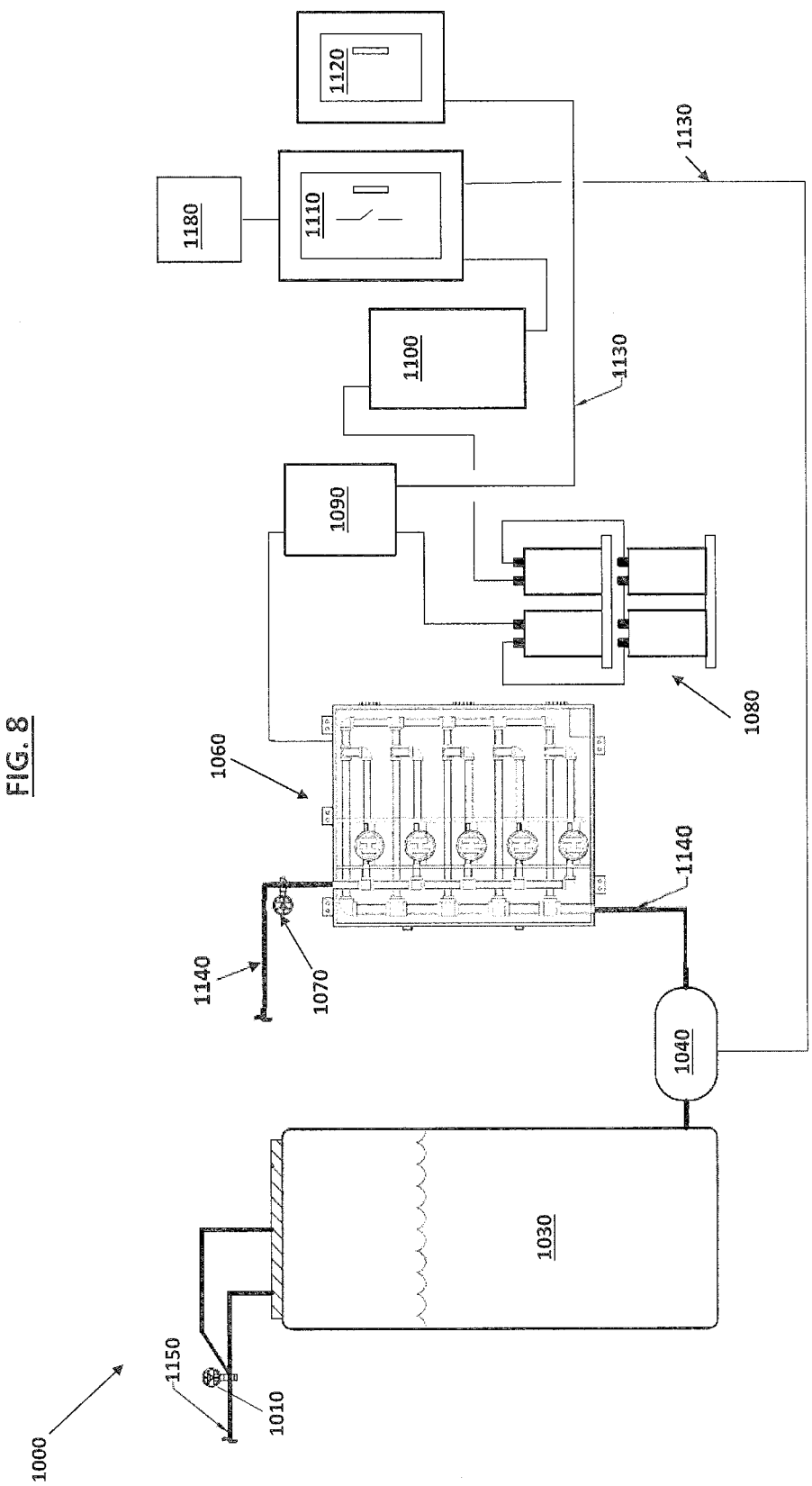
FIG. 8 is a schematic diagram of a secondary electric power system, in accordance with some embodiments of the present disclosure.

FIG. 8 shows a schematic diagram of a secondary electric power system 1000. In secondary electric power system 1000, fluid storage tank 1030 receives fluid from a source via incoming fluid supply line 1150 and incoming control valve 1010. In some embodiments, the source may be a residential water supply, well, AC condensate, or a water truck. The fluid is pumped from fluid storage tank 1030 to grid 1060 by pump 1040. Pump 1040 is connected to grid 1060 by fluid pipe 1140. In some embodiments, pump 1040 may be a water pump or air compressor. Once the fluid reaches the grid 1060, it is pumped through electric generators 610, which are contained within grid housing 630. The fluid is then discharged from the grid through control valve 1070 and fluid pipe 1140. In FIG. 8, the generators 610 are shown to be fluidly connected in parallel, where fluid pressure at each generator 610 inlet is nominally the same and the fluid pressure at each generator outlet is nominally the same. In other words, the pressure drop is the same across each generator 610. In some embodiments, the generators 610 may be fluidly connected in series. Further, the generators 610 may be electrically connected in series or parallel depending on the user's needs. In some embodiments, the fluid may be recirculated back into the fluid storage tank 1030 where it may be recycled by the system. In some embodiments, the fluid may be discharged to a drain or the atmosphere.

The power generated by the electric generators 610 travels through controller 1090 and is stored in battery storage banks 1080 for AC power conversion by inverter 1100 or used directly as DC power and wired through conduit 1130 to DC supply panel 1120. In some embodiments, AC power may be used to power large items such as an HVAC unit, refrigerator, range, and dishwasher. AC power is distributed through distribution panel 1110. In some embodiments, DC power sourced directly from the grid 1060 may power low voltage items such as lights, cell phone chargers, or computers. The controller 1090 is used to regulate the charge voltage and amperage depending on battery storage bank 1080 size and demand. The pump 1040 is wired to the distribution panel 1110. In some embodiments, the system 1000 may be controlled and monitored by a user-friendly mobile app.

When a primary power interface 1180 is switched off, the secondary electric power system 1000 is able to start the motor in pump 1040 with the power stored in battery storage banks 1080. The distribution panel 1110 includes a switch capable of isolating the primary power interface 1180. The electricity is wired to the distribution panel 1110 and through conduit 1130 to start pump 1040.

Figure 9:
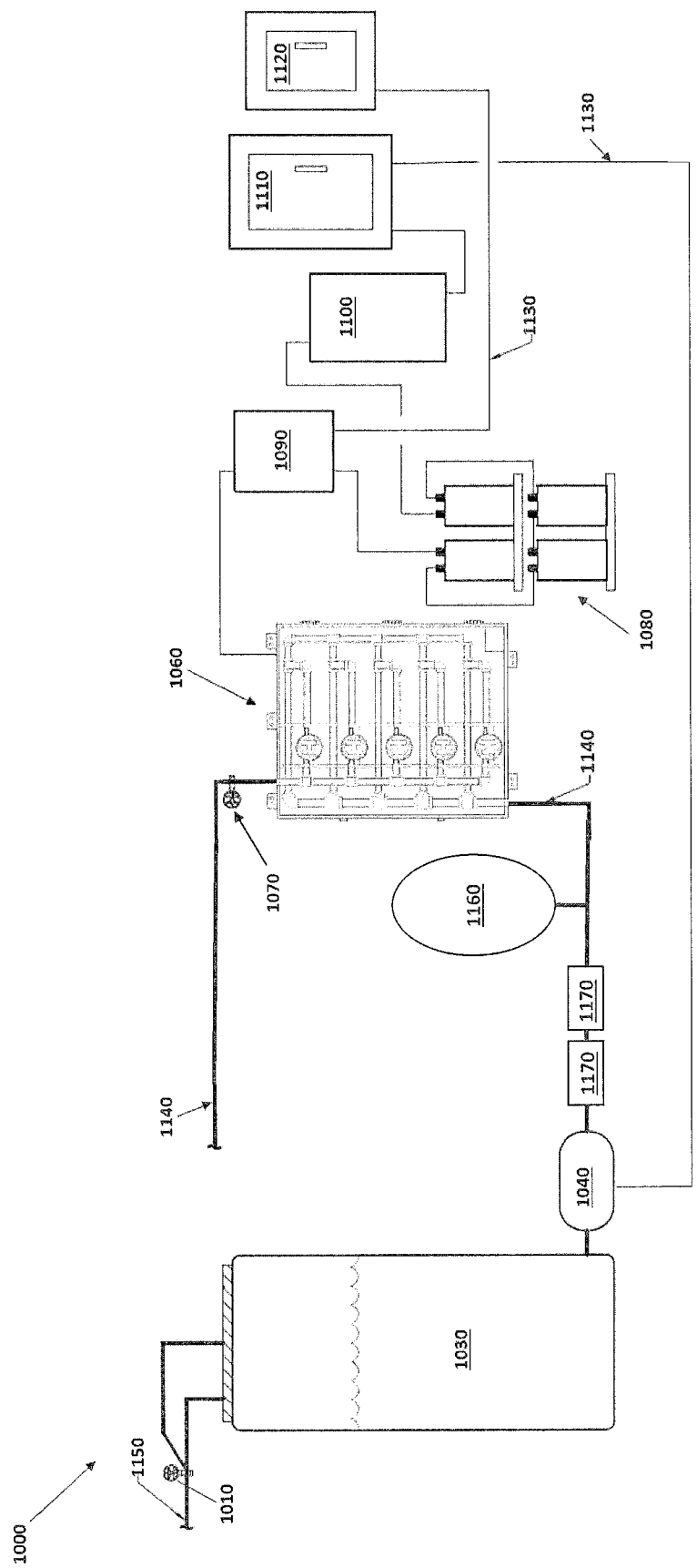
FIG. 9 is a schematic diagram of a secondary electric power system, in accordance with some embodiments of the present disclosure.

FIG. 9 is a schematic diagram of a secondary electric power system 1000 similar to FIG. 8, with the addition of an accumulator 1160 and filters 1170, which the fluid may pass through before reaching the grid 1060. Accumulator 1160 may include an air bladder and functions as a pressure storage reservoir. Accumulator 1160 may be used to maintain the pressure of the fluid entering the grid. Filters 1170 may remove sediment and other impurities from the fluid before it reaches the grid. The secondary power system and its components may be integrally connected to the building's water distribution system. For example, the water from the pump may be used to increase the pressure of the entire system, or the water supply lines and the drain systems may be common to both the secondary power system and the buildings plumbing, sewer, or sprinkler system.

Figure 10:
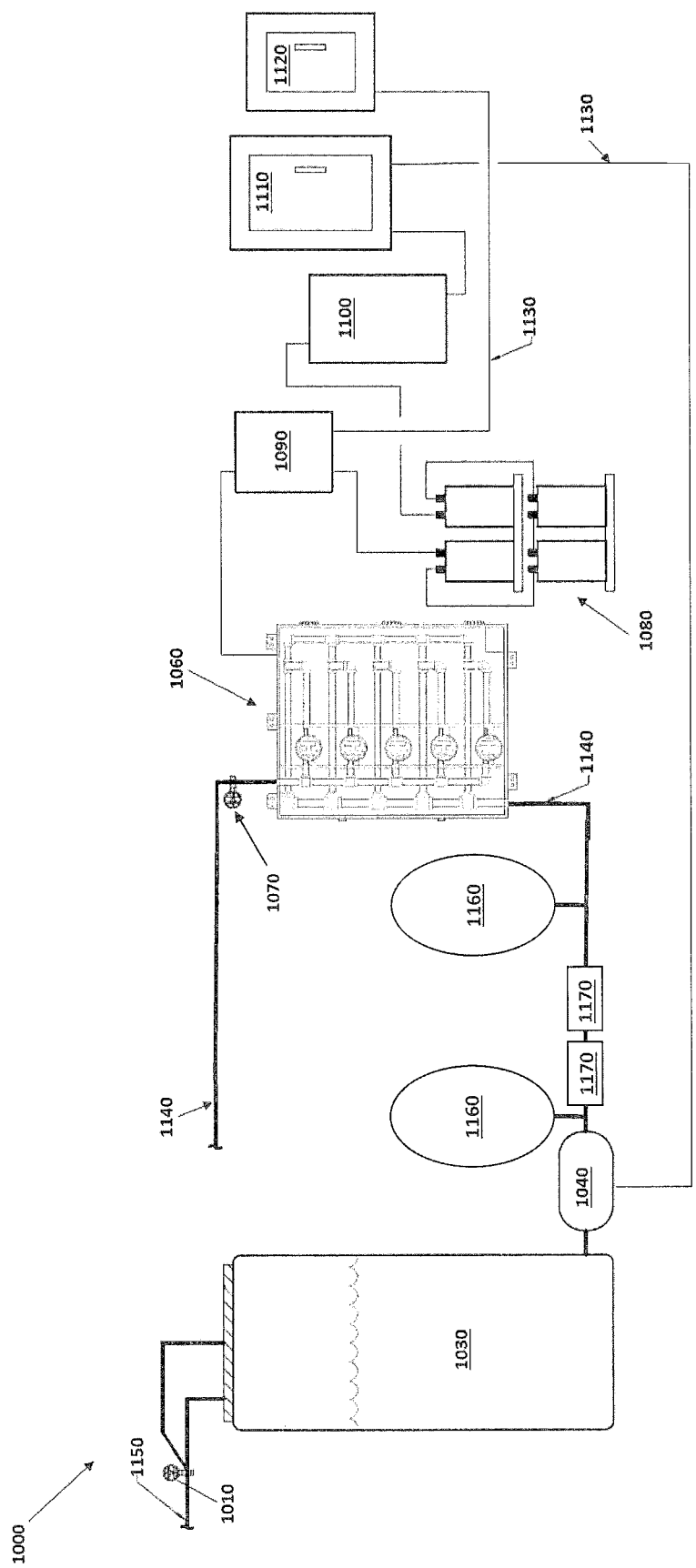
FIG. 10 is a schematic diagram of a secondary electric power system, in accordance with some embodiments of the present disclosure.

FIG. 10 is a schematic diagram of a secondary electric power system 1000 similar to FIG. 9, with the addition of a second accumulator 1160. This second accumulator 1160 functions to prevent any variations in the pressure of the fluid before it enters the filters 1170.

In addition to the secondary electric power systems described above, the present disclosure provides methods for operating a secondary electric power system 1000. FIG. 11 is a flow diagram of such a method. Method 2000 begins at block 2010.

At block 2020, a fluid is provided at a fluid supply and at a first pressure. At block 2030 a fluid is received at a pump fluidly connected to the fluid supply. At block 2040, a fluid is pumped at a second pressure to a grid fluidly connected to the pump. The grid comprises electric generators with an inlet at the second pressure and an outlet at a third pressure, the third pressure lower than the second pressure. The third pressure may be lower than the first pressure. The inlet is fluidly connected to the pump and the outlet is fluidly connected to the outlet pipe. The electric generators are electrically connected to rectifiers.

At block 2050, fluid is supplied to each generator. At block 2060, electricity is generated at each generator. At block 2070, electricity is received at a controller electrically connected to the rectifiers of the grid. At block 2080, electricity is received at a battery storage bank electrically connected to the electric generators via the controller. At block 2090, electricity is received at a power inverter electrically connected to the battery storage bank. At block 2100, electricity is received at a distribution panel electrically connected to the power inverter and pump. At block 2110, the distribution panel is operated as a power source for the pump. At block 2120, a primary power interface is operated. At block 2130, the primary power interface is isolated from the distribution panel at a switch. The method 2000 ends at block 2140.

Although examples are illustrated and described herein, embodiments are nevertheless not limited to the details shown, since various modifications and structural changes may be made therein by those of ordinary skill within the scope and range of equivalents of the claims.

I claim:

1. A grid comprising:
    a supply pipe receiving a fluid from a fluid supply at a first pressure;
    a plurality of branch pipes coupled to and receiving the fluid from the supply pipe;
    a plurality of electric generators, wherein each electric generator is coupled to one of the plurality of branch pipes and each electric generator comprises:
        a fluid wheel comprising:
            a plurality of cups coupled to a fluid wheel axle, wherein the cups receive the fluid from one of the plurality of branch pipes, which propels the cups and spins the fluid wheel axle;
        a ring gear housing coupled to the fluid wheel axle;
        a plurality of gears propelled by the ring gear housing;
        a sun gear propelled by the plurality of gears;
        a magnetic rotor propelled around a plurality of stationary stator coils by the sun gear;
        a power output connected to a bridge rectifier;
    wherein the plurality of generators are fluidly connected in parallel;
    an outlet pipe receiving the fluid from the plurality of generators at a second pressure, the second pressure less than the first pressure.

* * * * *